US007277772B2

(12) United States Patent
Mayer

(10) Patent No.: US 7,277,772 B2
(45) Date of Patent: Oct. 2, 2007

(54) MAIL INSERTER MACHINE REMOTE CONTROL WITH A SCANNER

(75) Inventor: Paul Mayer, Middlesbury, CT (US)

(73) Assignee: Pitney Bowes Inc., Stamford, CT (US)

( * ) Notice: Subject to any disclaimer, the term of this patent is extended or adjusted under 35 U.S.C. 154(b) by 186 days.

(21) Appl. No.: 11/109,413

(22) Filed: Apr. 19, 2005

(65) Prior Publication Data

US 2005/0187655 A1 Aug. 25, 2005

(51) Int. Cl.
*G06F 7/00* (2006.01)

(52) U.S. Cl. .................. 700/225; 700/220; 270/52.02; 270/52.06

(58) Field of Classification Search ................ 700/225; 270/52.02, 52.06
See application file for complete search history.

(56) References Cited

U.S. PATENT DOCUMENTS 5,027,279 A 6/1991 Gottlieb et al. ............. 364/478
6,137,590 A 10/2000 Mori ......................... 358/1.17
6,498,567 B1 12/2002 Grefenstette et al. .. 340/825.62
6,885,910 B2 * 4/2005 Mayer ........................ 700/225

* cited by examiner

*Primary Examiner*—Khoi H Tran
(74) *Attorney, Agent, or Firm*—Michael J. Cummings; Angelo N. Chaclas

(57) ABSTRACT

An integrated remote control and integrated scanner (20) for use with a mail inserter (10), including a user interface and device logic module (20*b*), a transceiver (20*a*) for wirelessly communicating with the mail inserter (10), and an (embedded) scanner (20*c*), all provided as a single hand-held device (20). An operator can use the device (20) to send remote control commands to the mail inserter (10) and also operate the included scanner (20*c*) (used, e.g., for obtaining scan codes of mail pieces so that the operator can indicate to the mail inserter (10) whether to recreate the mailpiece).

5 Claims, 2 Drawing Sheets

MAIL INSERTER MACHINE REMOTE CONTROL WITH A SCANNER

BACKGROUND OF THE INVENTION

1. Technical Field

This invention relates generally to inserter machines included in mass mailing equipment, for assembling documents into batches or into collations and then for inserting the collations into envelopes. More particularly, this invention relates to the remote control of a mail inserter machine and also to the communication to such a machine of bar codes on some mail pieces being processed by the machine.

2. Description of Related Art

In the high volume mail industry, in both U.S. First Class and Third Class mail, envelopes are filled with various letter pieces using automated (mass) mail inserter machines. For example, U.S. Pat. Nos. 5,029,832 and 5,211,384 disclose an in-line mail inserter machine having envelope and feeding assemblies, an envelope inserting station, a sealing and stacking assembly, and various diverter stations.

Mail inserters may run at high speeds, sometimes processing up to thousands of mail pieces per hour (in some cases, up to 18,000 pieces per hour), and state of the art mail inserters often include scanner devices that read scan codes (bar codes) on mail piece constituents (envelope and inserts) encoding an identifier for identifying the mail piece constituents to the inserter, thus making it possible for the inserter to keep track of whether mail piece constituents that have been input to the inserter have been successfully processed (i.e. that envelopes and one or more corresponding inserts have been properly combined into a single mail piece) and output by the inserter.

More specifically, to produce mailings where the content of each mail piece varies, the inputs to an inserter are computer-generated and printed documents, with each document containing information intended for a particular addressee. The documents may originate from a stack of cut sheets or from a web of forms. It is the function of the inserter to accept the documents and produce the individual mailings that correspond to each document. To accomplish this, as shown in FIG. 1, the typical prior art inserter 10 includes a variety of modules for performing different tasks on the documents passing through the inserter. Typical modules are: various web handling modules 10*a* (slitters, cutters and bursters) for separating the continuous forms into singular or discrete documents, a sheet feeder module 10*b* for feeding individual cut sheets, an accumulator module 10*c* for assembling the sheets and/or form documents into a collation, a folder module 10*d* for folding the collation into a desired configuration, a conveyor/staging module 10*e* for transporting and queuing the collation, one or more enclosure feeder modules 10*f* for assembling and adding packets of enclosures to the collation, an inserting station module 10*g* for inserting the collation into an envelope, and a controller 10*h* to synchronize the operation of the overall inserter 10 to ensure that the collations are properly assembled. Examples of such inserter systems are the 8 Series™ and 9 Series™ inserter systems available from Pitney Bowes, Inc., with headquarters in Stamford, Conn.

Typically, information for control of such an inserter is read from a control document by a scanner associated with or included with the most upstream module in the inserter, such as the conveyor/staging module 10*e* (FIG. 1). The control document is generally an address bearing document and contains information specific to a particular addressee. Additionally, each control document contains control information for instructing the downstream modules on how to assemble a particular mail piece. Once scanned by the inserter as the control document enters the inserter, the control information is transmitted to the controller; the controller then monitors the processing of the collation through each module. Generally, the control document includes a barcode type control code or other machine-readable markings defining the number of forms or sheets to be accumulated into the collation, the number of enclosures from each of the enclosure feeder modules to be assembled to the collation, and information for other purposes, such as the selection of appropriate postage.

Operation at the high speeds used in state of the art inserters occasionally results in damage to mail pieces. Sometimes a mail piece can be damaged and jam the inserter or otherwise cause the inserter to stop, and sometimes a mail piece can be damaged but the machine continues processing mail pieces.

State of the art mail inserters often include features that detect when a mail piece has been possibly damaged even when the machine is not jammed; such machines typically divert such suspect mail pieces (usually at the stage where the envelope and inserts have been joined to form a completed mailpiece) to a bin 10*k* (FIG. 1) to be examined by an operator. The operator manually inspects each mail piece diverted to the bin and decides whether the mail piece should be reprinted or not. In directing a mail piece to the bin for manual inspection, a state of the art inserter typically enters the identifier (from the scan code) of the mail piece in a database 10*m* of suspect mailpieces. The operator then, after inspection of the mail piece, uses a scanner 10*j* (FIG. 1), separate and distinct from the remote control 10*i*, to pick up the identifier of the mail piece and to communicate it to the controller 10*h* along with an indication that the mail piece needs to be reprinted or is instead acceptable so that it need not be reprinted and can be removed from the database.

In case of jamming or in case of the inserter otherwise being caused to stop, state of the art mail inserters use the bar code identifiers to determine what mailpieces are affected and so possibly damaged. As in case of possibly damaged mailpieces being diverted to a bin for manual inspection, when an inserter is interrupted an operator will also typically manually inspect affected mailpieces and communicate the status of such mailpieces to the inserter using the scanner 10*j* to read the identifier of the affected mailpieces.

To maintain control of an inserter such as an inserter of the type illustrated in FIG. 1, an operator typically uses a (wireless) remote control 10*i* to communicate with the controller 10*h* (and may also communicate directly with the controller using an interface provided as part of the controller). The operator keeps such a remote control at hand whenever the inserter is in operation. As mentioned, for reading scan codes of suspect mailpieces, the operator uses a scanner 10*j* separate and distinct from the remote control. Often, the scanner device 10*j* is such as to have to be wired to the inserter controller 10*h* for communicating scan codes of mailpieces examined and then scanned by the operator.

It would be advantageous to have a device including as a single preferably wireless unit the capabilities of both a remote control (for starting and stopping an inserter, among other functions related to the operation of the inserter) as well as a scanner.

SUMMARY OF THE INVENTION

Accordingly, in a first aspect of the invention, an integrated remote control and scanner for use with a mail inserter is provided, comprising: a user interface and device logic module, responsive to user inputs indicating controller command inputs and scanner command inputs and also indicating mailpiece damage indicators for associating with scanned mailpieces, and also responsive to scanned scan codes, for providing corresponding inserter control signals, scanner control signals, and scan codes and associated mailpiece damage indicators; a transceiver, responsive to the inserter control signals and scan codes with associated mailpiece damage indicators, for providing corresponding wireless signals; and a scanner, responsive to the scanner control signals, for providing the scanned scan codes; wherein the user interface and device logic module, transceiver, and scanner are all integrated into a single hand-held device.

In accord with the first aspect of the invention, the user interface and device logic module may comprise: a user interface, responsive to the user inputs, for providing controller logic inputs and also for providing scanner logic inputs; an inserter control logic module, responsive to the controller logic inputs, for providing the inserter control signals; and a scanner control logic module, responsive to the scanner logic inputs, for providing the scanner control signals, and further responsive to the scanned scan codes, for providing the scan codes and associated mailpiece damage indicators. Further, the user interface may also be responsive to feedback signalling by the scanner control logic module indicating information and advisories in connection with operation of the scanner.

Also in accord with the first aspect of the invention, the user interface and device logic module may be further responsive to any feedback or other signalling by the mail inserter via the transceiver.

In a second aspect of the invention, a method for controlling a mail inserter is provided comprising using an integrated remote control and scanner according to the first aspect of the invention.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention. As shown throughout the drawings, like reference numerals designate like or corresponding parts.

BEST MODE FOR CARRYING OUT THE INVENTION

Figure 1:
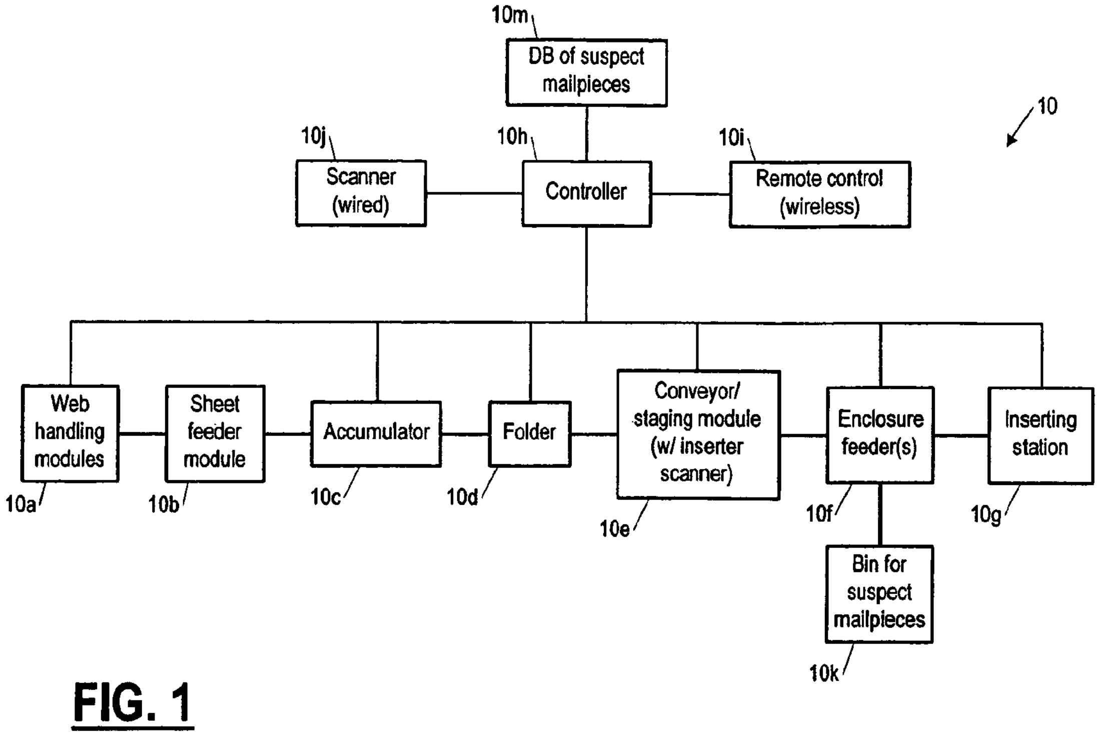
FIG. 1 is a block diagram of an inserter system according to the prior art, having a remote control and separate operator scanner device.
Figure 2:
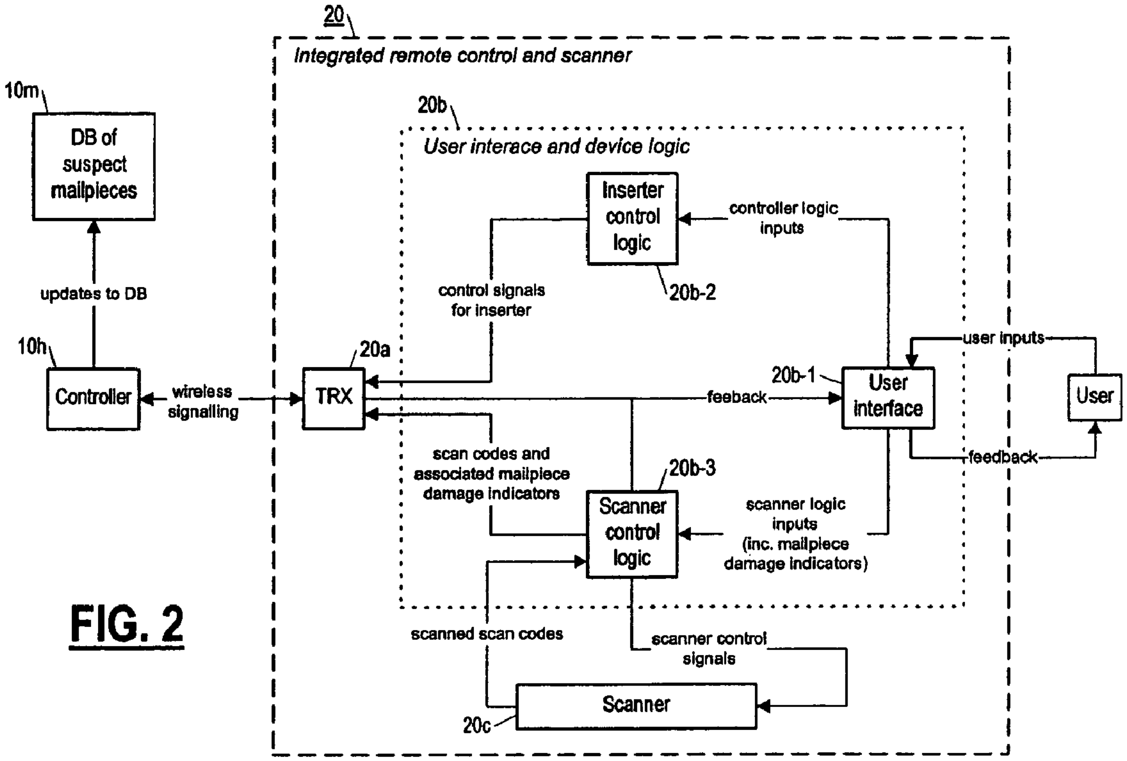
FIG. 2 is a block diagram of an inserter system according to the invention, having a remote control and embedded scanner.

Referring now to FIGS. 1 and FIG. 2, the invention provides as a single hand-held unit an integrated remote control and scanner device 20 for use with and as part of an inserter 10, the inserter 10 being otherwise according to the prior art, and so including a controller 10*h*. The integrated scanner and remote control 20 provides for scanning scan codes of (possibly damaged) mailpieces for which the controller has possibly previously stored the scan codes in a database 10*m* of suspect mailpieces, communicating the scan codes identifying the mailpieces to the controller 10*h* along with commands to either reprint the mailpieces or to simply remove the mailpiece scan codes from the database 10*m* of suspect mailpieces, and for communicating other commands related to control of the inserter. The mechanical construction and arrangement of the various modules that make up such an inserter are well known by those skilled in the art and depend upon the particular requirements of each installation. A detailed description of an inserter system of the type in which the present invention may be employed is provided in U.S. Pat. No. 4,547,856, entitled UNIVERSAL MULTI-STATION DOCUMENT INSERTER, issued Oct. 15, 1985, assigned to the assignee of the present invention and hereby incorporated by reference.

The integrated remote control and scanner 20 provided by the invention includes a transceiver (TRX) 20*a* for wirelessly communicating with the controller 10*h* which also includes a transceiver (not shown), a user interface and device logic module 20*b*, and scanner (hardware and controller) 20*c*. The user interface and device logic 20*b* includes as logical (and in some embodiments also actual) components a user interface module 20*b*-1, a remote control logic module 20*b*-2 (for control of the inserter machine), and a scanner logic module 20*b*-3 (for control of the scanner 20*c*). The scanner 20*c* in combination with the scanner-related aspects of the user interface and device logic module 20*b* provide in effect an embedded (in the hand-held device 20) scanner.

The transceiver 20*a* of the integrated remote control and scanner device 20 allows for wireless communication with the controller 10*h*, i.e. information is conveyed between the device 20 and the inserter controller 10*h* as modulations of either infrared or radiofrequency carrier waves. Within the device 20, the transceiver 20*a* is preferably coupled only to the user interface and device logic 20*b*, not to the scanner 20*c*. Like the transceiver 20*a*, the scanner 20*c* is also preferably coupled only to the user interface and device logic 20*b*. Thus, the user interface and device logic 20*b* acts as the nerve center and communication path for communication between an operator (via its user interface), the mail inserter 10, and the scanner 20*c*.

The user interface and device logic module 20*b* accepts from an operator user inputs related to the operation of the inserter 10, user inputs related to the operation of the included scanner 20*c*, and user inputs related to mailpieces scanned using the device 20. Upon receiving user inputs related to the operation of the inserter 10, the user interface and device logic module 20*b* provides corresponding control signals for the inserter 10, which are provided to the transceiver 20*a* so as to be communicated wirelessly to the controller 10*h*. Upon receiving user inputs related to the operation of the included scanner 20*c*, the user interface and device logic module 20*b* provides corresponding control signals for the scanner 20*c* and communicates the control signals via an internal wired connection. In case of a mailpiece having been possibly damaged, an operator can use the device 20 to scan the mailpiece (so that a scanned scan code is then provided to the user interface and device logic module 20*b* by the included scanner 20*c*) and then indicate whether the mailpiece has been damaged, and the user interface and device logic module 20*b* will then provide to the transceiver 20*a* the scanned scan code and an indicator—called here a mailpiece damage indicator—indicating whether the mailpiece has been damaged to the extent-that it warrants being reprinted (recreated). The transceiver 20*a* then conveys the scanned scan code and associated mailpiece damage indicator wirelessly to the controller 10*h* (which then removes the corresponding scan code from a database 10*m* of suspect mailpieces and then recreates the mailpiece if the mailpiece damage indicator so requires).

Although the device 20 may be implemented so as to have a single user interface and device logic module 20*b* including user interface functionality integrated with remote control logic and scanner logic, the user interface and device logic module 20*b* may be actually or logically decomposed so as to be viewed as including a user interface module 20*b*-1, an inserter control logic module 20*b*-2, and a scanner control logic module 20*b*-3. The transceiver is preferably dumb (in that it is not programmed to read and interpret the information it communicates between the controller 10*h* and the user interface and device logic module 20*b*), and in embodiments in which the user interface and device logic module 20*b* is as described and shown in FIG. 2, any feedback or other communication from the controller 10*h* is conveyed to the user interface module 20*b*-1.

Thus, according to the invention, a user is able to use the user interface and device logic module 20*b* of the device 20 to send inserter control signals to the mail inserter 10, to use it to send scanner control signals to the included scanner 20*c* so as to have the device 20 scan a scan code of a mailpiece, and to use it to provide a mailpiece damage indicator to be associated with the scanned scan code and to convey the scanned scan code and the associated mailpiece damage indicator to the inserter 10.

The user interface 20*b* is not only of use in enabling an operator to communicate with the controller 10*h* or the scanner 20*c*, but is also of use in providing displays for viewing informational and advisory signals—i.e. feedback signals—issued by the controller or by the scanner.

It is to be understood that the above-described arrangements are only illustrative of the application of the principles of the present invention. Numerous modifications and alternative arrangements may be devised by those skilled in the art without departing from the scope of the present invention, and the appended claims are intended to cover such modifications and arrangements.

What is claimed is:

1. A mail processing system comprising:

a mail inserter; and an integrated remote control and scanner comprising:

(a) a user interface and device logic module responsive to user inputs, the user input including command inputs and mailpiece damage indicators for association with scanned mailpieces, and also responsive to scanned scan codes, the user interface and device logic module configured to provide inserter control signals, scanner control signals, and associating scan codes with mailpiece damage indicators;

(b) a transceiver responsive to the inserter control signals and scan codes with associated mailpiece damage indicators and configured to provide corresponding signals to the mail inserter; and (c) a scanner responsive to the scanner control signals, and configured to provide the scanned scan codes;

wherein the user interface, device logic module transceiver and scanner are all integrated into a single hand-held device.

2. The mail processing system as in claim 1, wherein the user interface and device logic module comprises:

a user interface responsive to the user inputs, configured for providing controller logic inputs and also for providing scanner logic inputs;

an inserter control logic module responsive to the controller logic inputs, configured for providing the inserter control signals; and a scanner control logic module responsive to the scanner logic inputs, configured for providing the scanner control signals, and further responsive to the scanned scan codes, configured for providing the scan codes and associated mailpiece damage indicators.

3. The mail processing system as in claim 2, wherein the user interface is further responsive to feedback signals by the scanner control logic module that indicate information and advisories in connection with operation of the scanner.

4. The mail processing system as in claim 1, wherein the user interface and device logic module is further responsive to any feedback or other signaling by the mail inserter via the transceiver.

5. The mail processing system of claim 1 wherein the transceiver is a wireless transceiver.

* * * * *

UNITED STATES PATENT AND TRADEMARK OFFICE

CERTIFICATE OF CORRECTION

PATENT NO. : 7,277,772 B2
APPLICATION NO. : 11/109413
DATED : October 2, 2007
INVENTOR(S) : Paul Mayer It is certified that error appears in the above-identified patent and that said Letters Patent is hereby corrected as shown below:

On the title page insert item (60),

--This application claims priority of U.S. Application Serial No. 10/653,853, filed on September 02, 2003, issued as Patent No. 6,885,910.--

Signed and Sealed this

Sixteenth Day of March, 2010

David J. Kappos
*Director of the United States Patent and Trademark Office*